United States Patent Office 3,480,380
Patented Nov. 25, 1969

3,480,380
COMPOSITE CELLULOSE-WOOL PRODUCTS
Douglas J. Bridgeford and Albin F. Turbak, Danville, Ill., assignors to Tee-Pak, Inc.
No Drawing. Filed Apr. 6, 1966, Ser. No. 540,487
Int. Cl. D06m *13/28*
U.S. Cl. 8—115.6     13 Claims

ABSTRACT OF THE DISCLOSURE

Wool fibers, yarns, or fabrics are rendered shrink proof by treating with a solution of a decausticized polymeric alcohol xanthate of D.S. greater than 3% and pH less than 13 followed by regenerating the polymeric alcohol as a coating on the wool by heat or by chemical decomposition of the xanthate. The treatment may be preceded by scouring or oxidation or other treatment of the wool fibers to render the same more receptive to the coating or may be provided with a primer coating of an adhesive material or an adhesive material added in admixture with the coating solution.

---

This invention relates to the preparation of wool fiber products treated with cellulosic or other polymeric alcohol derivatives prepared in accordance with the procedures set forth in U.S. patent applications, Ser. No. 200,621 filed June 7, 1962, now U.S. Patent 3,291,789, and Ser. No. 416,795 filed Dec. 8, 1964, now U.S. Patent 3,399,069.

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g., ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film of regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In D. J. Bridgeford U.S. patent application, Ser. No. 200,621, filed June 7, 1962, now U.S. Patent 3,291,789, there are described several inexpensive processes for decausticizing various polymeric alcohol xanthates. In that patent application there are described processes in which alkaline solutions of various polymeric alcohol xanthates are decausticized by dialysis or by treatment with ion exchange or ion retardation materials.

Solutions of polymeric alcohol xanthates which have been decausticized as described in said Bridgeford patent application are especially useful as wet and dry strength additives for paper and for various other purposes, such as the treatment of wool and other textile fibers. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in said Bridgeford patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

In the preparation of viscose and other polymeric alcohol xanthates, many undesired by-products are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In D. J. Bridgeford U.S. patent application, Ser. No. 200,621, it is reported that polymeric alcohols, principally film-forming carbohydrates or polysaccharides, such as cellulose, starch, amylose, dextran, etc., in the form of their caustic xanthate solutions, can be decausticized by dialysis, ion exchange, and/or ion retardation. The various procedures for decausticization of various xanthate solutions are described in considerable detail in that patent application.

In D. J. Bridgeford U.S. patent application, Ser. No. 416,795, now U.S. Patent 3,399,069, it is reported that decausticized solutions of polymeric alcohol xanthates, such as cellulose, starch, amylose, dextran, sugars, polyvinyl alcohol, polyallyl alcohol, etc., can be converted to finely divided, solid, stable products by spray drying. The decausticized solutions (which have been decausticized to a pH less than 13) are subjected to spray drying using a large volume of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

It was found that the dry decausticized xanthate powders which can be prepared in this manner can be dissolved or dispersed in water and other solvents or swell sufficiently upon admixture with water to be useful as additives in the formation of paper webs, and in the treatment of wool fibers for shrink proofing and other purposes.

It was most unexpected that decausticized xanthate solutions could be spray dried. Viscose is much more stable on extended storage, both at low and elevated temperatures, than is a solution of decausticized cellulose xanthate of the same cellulose content. Viscose, however, was found to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow countercurrent type, vertical down flow concurrent type, and vertical up flow concurrent type, although other commercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high at 316° C. to 420° C.

It should be noted that even where high air temperatures are used the temperature surrounding each particle being dried is approximately the wet bulb temperature of the drying gas and thus the product is not subjected to temperatures substantially above the boiling point of water.

It is therefore one object of this invention to provide new and improved wool products treated with polymeric alcohol derivatives.

Another object is to provide new and improved wool products containing a polymeric alcohol or derivative thereof prepared from a decausticized polymeric alcohol xanthate.

A feature of this invention is the provision of new and improved wool products containing polymeric alcohols or derivatives thereof introduced in the form of a solution of a decausticized polymeric alcohol xanthate which is subsequently insolubilized within the wool as a coating and impregnant on the fibers of the wool.

Still another feature of this invention is the provision of an improved wool product containing a polymeric alcohol or derivative thereof introduced by treatment of the fibers or the finished wool product with a solution of a polymeric alcohol xanthate decausticized to a pH less than 13 and subsequently insolubilized within and on the surface of the wool fibers.

Other objects and features of this invention will become apparent from time to time throughout the specification and claims as hereinafter related.

SUMMARY OF THE INVENTION

This invention comprises new and improved wool products containing polymeric alcohols or derivatives thereof introduced into the wool in the form of a decausticized solution and subsequently insolubilized therein.

The decausticized xanthate solutions which are prepared as described in the aforementioned co-pending patent applications of D. J. Bridgeford and the decausticized xanthate solutions which are reconstituted from the spray dried decausticized xanthate powders have been found to be especially useful as additives in the manufacture of paper, and in the treatment of wool fibers, yarns, and finished wool products to provide shrink proofing, improved washability, crease-proofing, etc. The xanthate solutions can be used as beater additives or size press additives or may be added as an off-machine coating treatment subsequent to the formation of the paper web. The xanthate solutions when impregnated in the paper web are subsequently regenerated by heat or by treatment with acid. Paper products which are prepared in this manner have improved properties of wet and dry strength, fold endurance, grease holdout, printing ink reception, etc. The xanthate solutions may similarly be used to impregnate wool fibers, yarns or fabrics followed by regeneration of cellulose on the surface of and within the fibers by heat or by treatment with acid. The wool may be scoured or otherwise treated to remove natural oils or waxes or may be oxidized or mechanically treated to provide an improved surface for adhesion of the cellulose coating, or may be treated with a primer coat of an adhesive material such as an isocyanate adhesive to provide for improved adhesion of the cellulose coating.

The following nonlimiting examples are illustrative of the preparation of the decausticized xanthate materials used in the preparation of the novel wool products which comprise this invention and are also illustrative of the process of preparation of such products and of the resulting products. In the various examples the term "wool" is intended to encompass any naturally occurring proteinaceous or keratinaceous fibers derived from animals including but not necessarily limited to sheep, lambs, goats, lama, alpaca, vicuna, human hair, etc.

Example 1

A commercial viscose solution is purified by a batch dialysis technique and converted to a decausticized, dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialysis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hour period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decausticized (pH 11), viscose is obtained. The decausticized viscose is fed through a commercial mixed flow spray dryer. The solution is atomized into the dryer and contacted with a high velocity heated air. In this drying operation the air inlet temperature is 130° C. and the air outlet temperature is 60° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. The product which is obtained has a xanthate sulfur content of about 12.5% on cellulose and a D.P. which is substantially the same as the viscose feed stock. The dry powdered product is stable against xanthate decomposition for several days at room temperature and almost indefinitely when refrigerated to 0° C. The product has a pH less than 13 when dissolved or dispersed in water at 1% concentration and a D.S. greater than 3%.

In this example aged or ripened viscose was used. In other experiments unaged or unripened, blender viscose was used with similar results. In fact, when blender viscose is used, both the feed and product xanthate sulfur contents are higher and the product more easily redissolved in water. If desired, the process can be carried out with specially prepared high xanthate viscose, having a xanthate D.S. in the range from 50 to 100% (i.e. 1.5 to 3.0 xanthate groups per anhydroglucose unit).

Example 2

In another experiment, the dialysis of viscose was carried out using an acid form cation exchange resin to maintain a high concentration gradient through the dialysis membrane to reduce the quantities of water required for the dialysis. A 60-in. long tube of regenerated cellulose was tied at one end to form an elongated bag. At the end of the bag was placed about 20 g. Amberlite I.R.C. 50 H (a carboxylic exchange resin in the acid form) and 50 ml. of water. The casing was then tied and additional amounts of water and ion exchange added and the bag again tied. This arrangement was repeated until a string of five batches of resin and water were obtained. This dialysis membrane containing acid form cation exchange resin beads was then placed in a wide mouth bottle containing 500 g. of viscose having a 4% cellulose content, produced by dilution of 8% cellulose content commercial blender viscose. The bottle was stoppered and shaken at 320 cycles per min. for 2½ hours. The shaker bed was maintained at a temperature of about 32° C. When the dialysis was complete, the dialysis membrane was removed from the bottle and the decausticized viscose solution which remained had a pH of 11.4. The dialyzed viscose which was thus produced was a viscous liquid of just barely pourable viscosity. The increase in viscosity was partially caused by decausticization but was also due to a ripening of the diluted viscose as a result of being held at a temperature of 32° C.

The procedure just described is repeated and the product diluted to produce about 5 gallons of 2% cellulose content solution. The decausticized viscose solution is fed into a commercial concurrent down flow type spray dryer. The decausticized viscose is atomized into the dryer and mixed with heated air. The air inlet temperature is 146° C. and the outlet temperature 107° C. As previously described, the evaporation of water from the atomized droplets of decausticized viscose maintains the surface temperature of the droplets sufficiently low to prevent excessive decomposition of the cellulose xanthate.

The product which is obtained is a finely divided, dry (moisture content less than about 5%), stable, solid. The individual particles are spherical in shape and have an average diameter of about 10 microns. The product has a xanthate sulfur content of about 15% on cellulose and is easily dissolved in water. This product is stable for several days at room temperature and almost indefinitely under refrigeration.

The solid, stable, finely divided sodium cellulose xanthate produced in Examples 1 and 2 is easily dissolved in water to produce a solution which can be used for a variety of purposes. The reconstituted solution can be regenerated as a film or filament by conventional acid treatment or by thermal decomposition. The solution is very effective for treating wool fibers, yarns, or finished wool products to coat the individual fibers with cellulose for shrink proofing the wool or providing improved washability or preset creases in wool fabrics.

Example 3

In this and subsequent examples, the preparation of various spray dried polymeric alcohol xanthates is described.

A high purity amylose (derived from corn) containing about 10% water and having a D.P. of about 700–900 is used in the formation of an alkali amylose xanthate solution similar to viscose.

An alkaline solution of 24% concentration (1580 g. water and 300 g. sodium hydroxide) was prepared and mixed with 300 ml. methanol and 150 g. amylose. The slurry which was formed was stirred for 10 min. and 200 ml. additional methanol added, and the more dilute slurry stirred for 1 hour at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize at age.

The alkali amylose which was produced was dried and aged for 43 hours at 25° C. to permit the preparation of relatively high concentration alkali amylose xanthate solutions. The gel weight was about 870 g. and comprised 12.6% alkali, 16% amylose, and 71% water.

The alkali amylose (870 g.) was spread on the bottom and on the porcelain plate of a 12 in. vacuum desiccator. Nitrogen purging was carried out and a vacuum was then applied. About 70 g. of carbon disulfide was drawn into the desiccator and the system allowed to stand in a water bath at 25° C. After about 5.25 hours, the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hours using a 2½ in. marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a commercial downflow countercurrent-type spray dryer. The amylose xanthate solution is sprayed into the dryer counter-currently to the flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry, solid comprising essentially decausticized sodium amylose xanthate.

The product consists of very small, hollow spheres ranging from submicron size up to balloons in the range of 30 to 60 microns in diameter and has an average particle size in the range of 5 to 20 microns.

This product has a xanthate sulfur content equal to about 75% of the xanthate sulfur content of the feed solution. The amylose xanthate powder is easily dissolved in water to produce viscous solutions which are useful in the formation of regenerated amylose films and fibers. The reconstituted amylose xanthate solutions are also useful as adhesives for wood and paper, as wet and dry strength additives for paper, and as a shrink proofing agent for treatment of wool fibers, yarns and fabrics. The powdered amylose xanthate product is stable for extended periods of time. If the powder is given an additional drying with extremely dry air at room temperature or by admixture with a desiccant material to reduce the water content to substantially zero there is substantially no loss of xanthate sulfur during storage at room temperature for several months.

Example 4

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November 1960, p. 68ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a commercial concurrent upflow spray dryer. The solution is atomized into the dryer into a stream of heated air. The air has an inlet temperature of about 163° C. and an outlet temperature of 104° C. Under these conditions the spray is converted to a finely-divided dry powder and recovered in the product collection system.

The sodium polyvinyl alcohol xanthate powder consists of hollow spherical particles ranging from submicron size to balloons having diameters of the order of 30 to 60 microns. The powder is stable on extended storage and is easily redissolved in water. A reconstituted solution of decausticized sodium polyvinyl alcohol xanthate is a viscous liquid which can be regenerated as a film or fiber and which is useful as an adhesive or as a wet and dry strength additive for paper, or as a treatment for wool fibers, yarns, or fabrics for shrink proofing, crease proofing, or improved washability.

Example 5

In this example, dilute sodium polyallyl alcohol xanthate is decausticized and converted to a dry stable powder.

The sodium polyallyl alcohol xanthate used in this example is prepared in accordance with the procedure of B. G. Ranby, described in Die Makromolekulare Chemie, November 1960, p. 68ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a commercial horizontal concurrent flow type dryer. The solution is atomized into the dryer into a stream of heated air. The air has an inlet temperature of about 163° C. and an outlet temperature of 104° C. Under these conditions the spray is converted to a finely divided powder and recovered in the product collection system.

The sodium polyallyl alcohol xanthate powder is finely divided and consists of hollow spherical particles ranging from submicron size to balloons having diameters of the order of 30 to 60 microns. The powder is stable on extended storage and is easily redissolved in water. A reconstituted solution of decausticized sodium polyallyl alcohol xanthate is a viscous liquid which can be regenerated as a film or fiber and which is useful as an adhesive or as a wet and dry strength additive for paper, or as a treatment for wool fibers, yarns, or fabrics for shrink proofing, crease proofing, or improved washability.

SPRAY DRYING OF XANTHATE SOLUTIONS DECAUSTICIZED BY CATION EXCHANGE

Viscose and analogous polymeric alcohol xanthate solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g., Zeo-Karb 215, Zeo-Karb 315, Amberlite IR 1, Amberlite IR 100, Duolite C 10, Duolite C 3, Dowex 30; sulfonated polystyrenes, e.g., Zeo-Karb 225, Amberlite IR 120, Duolite C 20, Dowex 50, and Nalcite HCR; sulfonated coal, e.g., Zeo-Karb H 1; nuclear substituted phosphonate resins, e.g., Duolite C 60 and Duolite C 61; carboxylic resins, e.g., Zeo-Karb 216, Zeo-Karb 226, Amberlite IRC 50, Duolite CS 100; acid treated zeolites; naturally occurring non-resinous ion exchange materials, e.g., cellulose, wood fibers (bast fiber) including fabricated forms thereof such as webs, papers, fabrics, and the like. The reference to ion exchange resins is intended to be generic to ion exchange material of the high capacity resinous type, to liquid ion exchangers, and to naturally occurring non-resinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali) the resulting solution has a pH less than 13 and is capable of being spray dried as will be subsequently described. When a polymeric alcohol xanthate solution is decausticized to a pH less than about 9 some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acids) of the specified polymeric alcohol in which some or all of the combined alkali has been removed.

The following non-limiting examples are illustrative of the preparation of stable, dry powders of polymeric alcohol xanthates by spray drying of xanthate solutions which have been neutralized or decausticized by cation exchange.

Example 6

An 8% cellulose content viscose, as used in Example 1, was diluted with distilled water to a 0.5% cellulose content. Amberlite IRC 50H resin beads were added intermittently to the diluted viscose with mechanical stirring over a period of about 10 minutes at 25° C. until the pH reached a value of about 8. A clear, light-amber colored liquid resulted. The liquid was filtered through a muslin filter cloth and had a viscosity of 5.1 cps. at high shear rates and 7.8 cps. at low shear rates.

The decausticized viscose, prepared as described above, is fed into a concurrent or parallel flow, up-flow type spray dryer. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The xanthate sulfur content of the product is about 75% of that of the feed to the dryer. The drying operation results in a very slight loss of xanthate sulfur but produces a dry, stable powder which can be stored for extended periods of time at room temperature and almost indefinitely under refrigeration. The sodium cellulose xanthate powder is easily redispersed in water to form a sodium cellulose xanthate solution from which films or fibers can be regenerated or which may be used as an adhesive or a wet or dry strength additive for paper, or for treating wool fibers, yarns, or fabrics for shrink proofing, crease proofing, or improved washability.

Example 7

In an additional series of experiments, viscose containing higher proportions of cellulose was treated with a cation exchange resin by passing the viscose through a column of resin designed for pressure operation. The column consisted of a 2 in. (O.D.) x 30 in. stainless steel tube provided with end caps having O-ring seals and 100 mesh stainless steel screens backed by 14 mesh screens for supporting the resin bed. In using the column, coarse glass wool was first placed over the screen and the bottom of the column. A portion of Amberlite IRC 50H resin was pretreated with water to prevent excessive compacting of the resin due to swelling on initial wetting. The moist resin was added to the column and tamped to minimize channeling during the ion exchange reaction.

In one experiment the column was partially filled with 150 g. of Amberlite IRC 50H resin. 600 g. of 2% cellulose content viscose was added to the column. The pressure on the column was gradually increased to 30 p.s.i.g. over about 5 minutes. 600 g. of decausticized viscose was eluted from the column in 3 minutes after the pressure reached 30 p.s.i.g. The initial effluent from the column had a pH of 5.5. The final effluent from the column had a pH of about 8.4 which increased to 9.0 after about 4 hours storage.

In another experiment the column was charged with 100 g. of Amberlite IRC 50H covered with a 0.75 in. layer of Amberlite IRC 50Na. Next, 547 g. of 3% cellulose content viscose was introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hours at 25° C.

In another experiment a column was charged with 100 g. of Amberlite IRC 50H covered with a 0.5 in. layer of Amberlite IRC 50Na. Then 700 g. of 2.5% cellulose content viscose was added to the column and a pressure of 55 p.s.i.g. applied. The entire 700 g. of viscose was eluted from the column in about 4.5 min. and had a pH of 12.5.

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described in Example 6, above. The viscose solution, in each case, is atomized into a stream of heated air. The air stream has inlet temperature of about 149° C. and an outlet temperature of about 104° C. As previously described, the evaporation of water from the individual droplets of solution maintains the surface temperature of the droplets (and the resulting solid particle) at a temperature not substantially in excess of the wet bulb temperature of the gas sream. The spray drying of the decausticized viscose solutions produces finely divided powders of sodium cellulose xanthate. The powder is a dry (moisture content less than about 3%) stable, solid material in the form of hollow spheres having diameters ranging from submicron size up to 60 microns in diameter. The dry solid product is stable for several days at room temperature and almost indefinitely under refrigeration. If the dry powder is dried further to remove substantially all of the water, the product can be stored almost indefinitely at room temperature.

The sodium cellulose xanthate powder produced as just described is easily dissolved in water to reconstitute a decausticized viscose solution. The solution thus prepared is useful as an adhesive for paper or wood and as a wet or dry strength additive for paper, or for treating wool fibers, yarns, or fabrics for shrink proofing, crease proofing, of improved washability.

Example 8

In another experiment, a 0.8% cellulose content viscose was mixed with Dowex 50WX8 sulfonic acid type resin in the hydrogen ion or acid form. The mixture was stirred for a few minutes and the decausticized solution recovered. The solution had a pH of 11.5 and did not coagulate or gel after storage for 24 hours at room temperature.

When this solution is spray dried as described in the previous example, a solid stable powder is obtained which is easily redissolved in water at the time and place of intended use.

Example 9

The composition of viscose (or similar polymeric alcohol xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange to produce cellulose xanthic acids (also called cellulose acid xanthates), the resulting product will hydrolyze to produce additional amounts of free alkali. However, this hydrolysis takes time and the composition of the resulting product, therefore, varies somewhat with the time required for the neutralization or ion exchange reaction. The composition of the decausticized viscose also depends to some extent upon the time that it has been stored.

In a series of experiments, a 0.5% cellulose content viscose was neutralized or decauticized by treatment with Amberlite IRC 50H resin and samples obtained in a pH range from 9.3 down to 6.5.

Analysis of the decausticized viscose having a pH of 6.9 showed that the composition contained about 57% of its xanthate content in the form of acid xanthate groups. At a pH of 7.3 the viscose contained 56% of its xanthate content in the form of acid xanthate groups. Viscose which was decausticized to a pH of 8.1 was found to contain 17% of its xanthate content in the form of acid xanthate groups. On the other hand, viscose which was decausticized to a pH of 9.3 contained no free acid xanthate groups.

When the decausticized viscose samples taken at various pH levels are spray dried in the dryer described in Example 6, above, a stable, solid sodium cellulose xanthate powder is obtained.

In each case there is a slight loss in xanthate sulfur content of the product relative to the feed. This results from a partial decomposition of the xanthate. The viscose samples which correspond to viscose having all free alkali removed (pH of about 9.3) are spray dried most efficiently with a minimum decomposition of the xanthate. Viscose which has been neutralized to a lower pH is somewhat less stable and is preferably dried using higher velocity and lower temperature air. Viscose samples which have been neutralized to a pH in the range from 9.3 up to 13 are progressively less stable, with increasing pH of the solution, during the spray drying process. This is unexpected since the opposite is true with respect to the neutralized solutions. The solutions decrease in stability with decrease in pH below pH 13.

In this range (pH 9–13), there is a more severe loss of xanthate sulfur. Nevertheless, with proper selection of temperature and air velocities in the spray dryer, spray dried products can be produced with are solid, stable and easily redissolved. Viscose, and other polymeric alcohol xanthate solutions having a pH above 13 cannot be spray dried without almost total loss of xanthate sulfur. In fact, attempts to dry viscose and other polymeric alcohol xanthates having a pH above 13 results in almost total regeneration of the cellulose or other polymeric alcohol therefrom. In such a case, the powdered product which is produced cannot be redissolved or redispersed and is lacking in all of the desirable properties found in the spray dried decausticized product.

Example 10

This example demonstrates that naturally occurring organic ion exchange materials can be used with substantially equal success in decausticizing viscose in preparation for drying.

An 8% cellulose content viscose as used in Example 1 was diluted to a 0.3% cellulose content with distilled water. The diluted viscose was slurried with bast fibers which had been acid treated to convert the ion exchange sites therein to the acid or hydrogen ion form. At the end of 10 min., the slurry was filtered and the dilute viscose was recovered as a light amber colored solution of cellulose xanthate having a pH of about 9.0.

The decausticized viscose thus prepared is fed into a spray dryer as described in Example 6 above. In the dryer the viscose is atomized and passed into a stream of heated air. The air has an inlet temperature of 143° C. and an outlet temperature of 104° C.

The viscose spray is completely dried to produce a finely divided solid product which is stable on extended storage. The product is sodium cellulose xanthate in the form of hollow spheres ranging from submicron size up to balloons in the range of 30 to 60 microns in diameter.

Example 11

A series of experiments were carried out in spray drying decausticized viscose under a variety of feed conditions.

Viscose having a 7.7% cellulose content was decausticized to various pH levels in the range from about 6.5 to 12.3 using Amberlite IRC50 ion exchange resin in the acid or hydrogen ion form. The decausticized viscose was diluted to a 2% cellulose content and spray dried in a dryer of the type described in Example 6 above.

The spray dried powders obtained in each of the runs contained about 65% cellulose and about 4% water. The product was a free flowing powder which is stable for several weeks at temperatures just below room temperature. Under refrigeration the powder is stable almost indefinitely. The sodium cellulose xanthate powder is very hygroscopic and must be protected against atmospheric moisture. The powders obtained in the various runs were further dried using various laboratory desiccants and also by extensive drying with bone dry air. Extensive drying with bone dry air has reduced the water content of the product to substantially less than 1%. The stability of the product is closely related to water content. The product tends to lose xanthate sulfur in the presence of moisture. The extremely dry product has a storage life of about six months or more at room temperature. In fact, the totally anhydrous product is stable even at moderately elevated temperatures for extended periods of time.

Example 12

An 8% amylose content solution of sodium amylose xanthate is prepared as described in Example 3, diluted to a 2% amylose content, and neutralized and decausticized by contact with an ion exchange resin in the acid form. Decausticized solutions of sodium amylose xanthate are produced in this manner at pH values ranging from 10.5 down to 7.6 or lower.

Decausticized solutions of sodium amylose xanthate prepared as described above are spray dried in a manner described in any of the previous examples. The solutions are preferably atomized into a stream of heated air having an inlet temperature of 143° C. and an outlet temperature of 102° C. The product obtained is a dry, stable, decausticized sodium amylose xanthate powder.

Example 13

A dilute solution of sodium polyvinyl alcohol xanthate is prepared as described in Example 4, decausticized to a pH of 8.0 by admixture with a cation exchange resin in the acid form, and spray dried as in the previous example. The product is a dry, stable powder of sodium polyvinyl alcohol xanthate and is easily dissolved or dispersed in water.

Sodium polyallyl alcohol xanthate solution is prepared as described in Example 5, decausticized, and spray dried as described above for the preparation of spray dried sodium amylose xanthate.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used is a strong-base or intermediate-base strength anion exchange resin in the salt form (non-hydroxyl form). When the viscose (or other xanthate) solution is contacted with an anion exchange resin in the salt form, the hydroxyl groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating by-products such as trithiocarbonates, mono- and dithiocarbonates, thiosulfates, perthiocarbonates, and sulfides which are produced as by-products in the xanthation process.

The treatment of viscose and similar solutions with anion exchange resins has the advantage of removing ionic by-products which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: intermediate base anion exchangers, e.g., Dowex 2; strong base anion exchangers, e.g., De-Acidite FF, Amberlite IRA 400, Amberlite IRA410, Dowex 1, Nalcite SAR; porous anion exchangers, e.g., Decolorite and Duolite S30, as well as naturally occurring anion exchangers, e.g., proteins containing ionizable amino groups, polymeric betaines, etc.

The following non-limiting examples are illustrative of the decausticization of polymeric alcohol xanthates by anion exchange:

Example 14

A glass column having an I.D. of 1 cm. was filled to a depth of 20 cm. with 50 mesh Dowex 1X4 ion exchange resin in the chloride form.

An 8% cellulose content viscose was diluted to 0.5% cellulose content and fed through the column under a pressure of 0.5 p.s.i.g. at a rate of 1 ml./min. The effluent from the column had a substantially constant pH of 11.8 and was a clear, colorless liquid.

This procedure was repeated using the same apparatus filled with Dowex 1X8 resin in the chloride form and the product was a clear liquid having a substantially constant pH of 11.8.

The decausticized viscose produced as just described is fed through a spray dryer as described in Example 6. The solution is atomized into a heated air stream having an inlet temperature of 115° C. and an outlet temperature of 60° C. The product obtained is a dry stable almost white powder comprising sodium cellulose xanthate containing a small amount of sodium chloride.

When dilute viscose was passed through an anion exchange column using other anion exchange resins, including Dowex 2X4 (chloride form), Amberlite IRA 400 (nitrate form), and Nalcite SAR (nitrate form), a decausticized product was obtained as described above.

When the decausticized product is spray dried, the resulting product is a dry stable white powder containing a small amount of a sodium salt impurity resulting from the introduction of the anion from the exchange resin. The anion exchange step is particularly effective in removing colored sulfur by-products. These colored by-products can also be removed by aeration of a cold solution which has been purified or decausticized by dialysis or cation exchange.

When the above procedure is repeated using solutions of sodium amylose xanthate, sodium polyvinyl alcohol xanthate, or sodium polyallyl alcohol xanthate, the solutions are readily decausticized and can be spray dried as described above.

SPRAY DRYING OF POLYMERIC ALCOHOL XANTHATE SOLUTIONS DECAUSTICIZED BY ION RETARDATION

Ion retardation resins constitute a new class of materials similar to ion exchange resins. They are prepared by polymerizing a cationic monomer inside the pores of an anion exchange resin or anionic monomer inside the pores of cationic exchange resin. The resulting linear polymer is trapped inside the cross linked ion exchange resin and cannot diffuse out. The resin system is physically and chemically stable and comprises a mixture of cation and anion exchangers with the mixing taking place at the molecular level.

In an ion retardation resin an ionic and cationic absorption sites are so closely associated that there is a partial neutralization of electrical charges in adjacent sites. However, the sites still have an attraction for mobile anions and cations and can associate with them to some extent. The result is that the resin will absorb both anions and cations from solutions with which it comes in contact, but the absorbed ions can be displaced from the resin by the use of water as an eluent. If the solution contains macromolecular ions, they cannot, in general, diffuse inside the resin beads, so a separation of small from large anions can take place. Ion retardation resins may be utilized in batch operations. However, since absorbed ions are only weakly held, their removal from solution is incomplete even in the presence of excess resin, and hence a column operation is generally preferred. In column operations, the solution to be treated is fed through the resin bed until the ion absorbing capacity of the bed is utilized as completely as possible. The absorbed ions are then eluted by rinsing the bed with water.

Example 15

In one experiment, a column of ion retardation resin was prepared using Retardation 11A8 (product of the Dow Chemical Company) which is a 50–100 mesh resinous material prepared by polymerizing acrylic acid inside Dowex 1 (a quaternary, strong base, styrene resin manufactured by the Dow Chemical Company). Before use, the resin was soaked in water to remove soluble impurities and to cause the resin to expand to its wet size. The preliminary washing of the resin is desirable to bring the resin bed to its full size and thus prevent variation in feed rate through the bed.

An 8% cellulose content (6% alkali) viscose was diluted to a 1% cellulose content for removal of alkali in the column. The dilute viscose was introduced into the top of the column and allowed to flow through by gravity. The eluent from the column had a pH of about 12 and was a clear colorless liquid. At a pH of 12, more than 99.9% of the free alkali in the viscose has been removed.

The recovery of the dilute viscose from the column was essentially quantitative and the decausticized product, substantially free of impurities, could be thermally regenerated into a coating or film.

When this decausticized solution is fed into a spray dryer as described and shown in FIG. 1, of Bridgeford U.S. Patent 3,399,069 a spray-dried product is produced which is stable over extended periods of time. The dilute solution is fed into the dryer through the atomizing nozzle into an air stream having an inlet temperature of 121° C. and outlet temperature of 60° C. The fine spray is quickly dried to produce a dry powder which is rapidly separated from the heated air before substantial decomposition of the xanthate can occur. The powder which is produced can be redissolved or redispersed in water or other substantially inert polar solvents and can be used as an adhesive for paper or wood or as a wet or dry strength additive in the manufacture of paper, or for treating wool fibers, yarns, or fabrics for shrink proofing, crease proofing, or improved washability.

Example 16

A column of Retardion 11A8 resin is prepared as described in Example 15. An 8% amylose content solution of sodium amylose xanthate is prepared as described in Example 3 and diluted to a 1% amylose content solution. The dilute amylose xanthate solution is then allowed to flow by gravity through the resin bed. The effluent from the column has an average pH of about 12, which would represent substantially complete removal of all free alkali in the solution.

When this solution of decausticized sodium amylose xanthate is spray-dried using the dryer described in Example 6 a fine powder is obtained which is stable for extended periods of time at room temperature and almost indefinitely under refrigeration. The product can be redissolved or dispersed in water or other inert polar solvent and used as an adhesive or as a wet-dry strength additive in the manufacture of paper, or for treating wool fibers, yarns, or fabrics for shrink proofing, crease proofing, or improved washability.

SPRAY-DRYING OF VISCOSE AND OTHER POLYMERIC ALCOHOL XANTHATE SOLUTIONS DECAUSTICIZED BY LIQUID ION EXCHANGERS

In some cases, the use of a liquid ion exchanger is advantageous in continuously decausticizing viscose (or other polymeric alcohol xanthate solutions) because the liquid exchange medium can be continuously removed and regenerated.

Example 17

A liquid ion exchanger was prepared by dissolving 20 g. of monolauryl acid orthophosphate in 50 ml. of carbon tetrachloride. A turbid dispersion was produced. A 250 ml. beaker was charged with 100 ml. of dilute (0.5% cellulose content) viscose and the liquid ion exchanger slowly added with stirring.

As the materials were mixed, spontaneous emulsion took place and the pH decresed slowly to pH 9. The mixture was centrifiuged to break the emulsion and decausticized viscose (pH 9) recovered as a clear, amber liquid.

When viscose which has been decausticized using a liquid ion exchanger as above described is fed into a spray dryer as described in Example 6 above, a dry, stable powder is obtained. The solution is atomized into a heated air stream having an inlet temperature of 116° C. and an outlet temperature of 60° C. The dry powdered product is stable for extended storage at room temperature and almost indefinitely under refrigeration.

When the dry powder is redissolved to reconstitute a decausticized viscose solution, the resulting solution can be regenerated into cellulose film or fiber (by thermal or acid regeneration) and can be used as a high wet and dry strength size for paper, or for treating wool fibers, yarns, or fabrics for shrink proofing, crease proofing, or improved washability.

The liquid ion exchange process used in decausticizing the viscose in preparation for spray-drying can be similarly used in the decausticizing of other polymeric alcohol xanthates. Other liquid ion exchangers (both anion and cation type), as well known in the art, can be used in this process.

SPRAY-DRYING OF VARIOUS POLYMERIC ALCOHOL XANTHATE SOLUTIONS DECAUSTICIZED BY VARIOUS MULTI-STEP PROCESSES

While the several processes of dialysis, cation exchange, anion exchange, ion retardation, etc., described above, are effective in decausticizing polymeric alcohol xanthate solutions, these processes are effective and in some cases more efficient when used in conjunction with one another. Thus, cation and anion exchange resins can be used for sequential treatment of various xanthate solutions, and mixtures of resins in the form of a mixed bed can similarly be used. Also, a combination of dialysis with cation or anion exchange is especially effective in decausticizing the various polymeric alcohol xanthate solutions. The decausticized solutions prepared by any such process can be spray-dried to produce exceptionally stable dry powdered materials.

Example 18

A 4% amylose-content, amylose xanthate solution was prepared as described in Example 3. About 100 g. of solution was placed in a regenerated cellulose bag and dialyzed by shaking the bag in 1.5 liters of water in a polyethylene bottle at 320 cycles per minute. The water was changed twice at 20-minute intervals; then it was changed again and the system left sanding at 25° C. overnight.

The amylose xanthate solution was recovered from the dialysis bag as a viscose liquid having a pH of 11.5. The dialyzed solution (pH 11.5) recovered from the dialysis bag was mixed with Amberlite IRC 50H resin to remove additional sodium ions therefrom. The solution was separated from the exchange resin and found to have a pH of 6.5.

When the dialyzed and ion exchanged solution is spray-dried in the apparatus described in Example 6 above, using an air inlet temperature of about 127° C. and an outlet temperature of 66° C., a stable, solid, dry powder is obtained.

When the spray-dried powder is redissolved, a reconstituted amylose xanthate solution (pH 6.5) is obtained which is quite viscous and can be regenerated to produce a film or filament by acid treatment or by thermal regeneration.

Example 19

A 1% cellulose content viscose was subjected to dialysis as described in Examples 1 to 3 to produce a decausticized product having a pH of about 12. The decausticized viscose was then mixed with a cation exchange resin, Amberlite IR 120H, to further remove sodium ions therefrom. The solution which was recovered from admixture with the resin was a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be redissolved to produce a solution which is useful in the preparation of regenerated cellulose films or fibers or as a wet or dry strength size for paper, or for treating wool fibers, yarns, or fabrics for shink proofing, crease proofing, or improved washability.

Example 20

A 1% cellulose content viscose is subjected to dialysis as described in Examples 1 to 3 to produce a decausticized product having a pH of about 12. The decausticized viscose is then mixed with a cation exchange resin, Zeo-Karb 226, to further remove sodium ions therefrom. The solution which is recovered from admixture with the resin is a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be redissolved to produce a solution which is useful in the preparation of regenerated cellulose films or fibers or as a wet or dry strength size for paper, or for treating wool fibers, yarns, or fabrics for shrink proofing, crease proofing, or improved washability.

Example 21

A 0.5% cellulose content viscose solution, freshly diluted, is fed through a column of Dowex 1X4 resin in the chloride form. A colorless effluent is recovered from the column having a pH slightly in excess of 12. The sulfur by-products in the viscose are removed in the form of a carrot-colored band near the top of the resin bed.

The effluent from the anion exchange column is then passed through a column containing Amberlite IRC 50H cation exchange resin to yield a colorless, odorless effluent. The solution recovered from the cation exchange column has an initial pH of 7.6.

When the pH 7.6 solution is spray dried as described in Example 18, there is produced a stable, dry powder. This powder can be redissolved in water to produce a cellulose xanthate solution free of alkali and sulfur by-products which can be thermally regenerated or regenerated by acid treatment to produce films or fibers. The cellulose xanthate solution can also be used as a wet or dry strength additive for paper, or for treating wool fibers, yarns, or fabrics for shrink proofing, crease proofing, or improved washability.

Example 22

A 1% cellulose content viscose solution, freshly diluted, is neutralized to pH 10 by admixture with Amberlite IRC 50H resin. The mixture is filtered to recover a fawn colored solution of cellulose xanthate.

The cation exchanged solution is then mixed with Dowex 1X4 anion exchange resin for a period of about 10 minutes. The solution which is recovered from the anion exchange resin is clear, colorless, and odorless, having a pH of about 10. The color-forming and odor-forming impurities are removed during the anion exchange treatment.

When the product solution is spray-dried as described in Example 18, there is produced a stable, dry, solid product. The dry powder which is produced is stable for extended periods of time at room temperature and almost indefinitely under refrigeration. As described in the previous examples, the spray-dried decausticized cellulose xanthate can be redissolved to produce solutions which are useful in the formation of films or fibers or as wet strength or dry strength additives for paper, or for treating wool fibers, yarns, or fabrics for shrink proofing, crease proofing, or improved washability.

Example 23

In another experiment, a mixed bed ion exchange resin was prepared by mixing about 15 g. of Amberlite IRC 50H cation exchange resin with 13 g. of Dowex 1XCl anion resin. The mixed resin was added to 150 ml. of 1% cellulose content diluted viscose and stirred for ten minutes. The supernatant solution which was recovered was a clear, colorless solution having a pH of 7.2.

When this solution is spray-dried as described in Example 18, a dry, solid powder is obtained which is stable for extended periods of time at room temperature and almost indefinitely under refrigeration. As previously described, the spray-dried cellulose xanthate powder may be redissolved to produce a solution which can be used in forming regenerated cellulose films or fibers or as a wet or dry strength additive for paper, or for treating wool fibers, yarns, or fabrics for shrink proofing, crease proofing, or improved washability.

USE OF DECAUSTICIZED POLYMERIC ALCOHOL XANTHATE POWDERS AND SOLUTIONS RECONSTITUTED THEREFROM IN TREATMENT OF WOOL

Decausticized viscose and other decausticized polymeric alcohol xanthates are useful for a variety of purposes for which the caustic-containing materials would have little or no application. For example, the treatment of wool with a caustic solution of a polymeric alcohol xanthate such as viscose results in a very substantial degradation of the wool resulting from chemical attack on the wool by the caustic.

The decausticization of polymeric alcohol xanthate solutions reduces considerably the formation of by-product materials upon regeneration of the polymeric alcohol. The decausticized polymeric alcohol xanthate solutions can be regenerated by treatment with acid, as can the caustic or unpurified materials. However, the decausticized solutions can be regenerated by treatment with acid to produce regenerated materials having a much smaller proportion of by-products than materials regenerated from unpurified solutions. Furthermore, the decausticized xanthate solutions can be regenerated thermally to produce products which are largely free of by-product materials. Also, the use of the decausticized xanthate solutions in the treatment of alkali sensitive materials such as wool, results in the production of vastly improved cellulose treated products.

The decausticized solutions are somewhat unstable thermally and tend to gel upon storage for an extended period of time. When the solutions are spray dried, as described above, the dry, solid powder which is produced is stable at room temperature for extended periods of time and almost indefinitely under refrigeration. When the stable, solid, decausticized xanthate powder is redissolved, solutions are obtained which are substantially the same as the decausticized solutions prior to spray drying and which are useful in the preparation of films and fibers, as wet and dry strength additives for papers, for treatment of wool fibers, yarns, and fabrics as will be subsequently described.

For many years there has been a substantial need for a treatment or modification of wool to render fibers, yarns and fabrics resistant to shrinkage upon washing. Generally, when wool fabrics are washed or even are merely contacted with water or aqueous solutions there is a shrinkage which takes place which involves (1) the mechanical relaxation of the fibers or of a woven or knitted fabric and (2) the felting of the individual wool fibers. The relaxation shrinkage or process shrinkage is that which occurs upon mere contact with water and is largely recoverable. The shrinkage resulting from felting is an irreversible shrinkage which results in a permanent change in the wool.

There have been numerous attempts made to treat wool to render it resistant to shrinkage. Wool has been treated with various oxidants to modify the surface of the fibers and render the same resistant to shrinkage. One of the more effective treatments uses materials which produce an interfacial condensation at the surface of the wool fibers. This treatment involves the in situ formation of polymers on the surface of the wool and is moderately effective (treatment with similar pre-formed polymers is not effective). The interfacial condensation treatment, however, is relatively expensive and difficult to carry out.

We have found that the treatment of wool fibers, yarns, or fabrics (preferably finished fabrics) with solutions of decausticized polymeric alcohol xanthates, prepared as described in the above examples, results in the shrink proofing of the wool. The treatment with the decausticized xanthate solutions may be preceded by a scouring of the wool or by an oxidation or other treatment to render the surface of the fibers more receptive to the cellulose or other polymeric alcohol coating, or may be provided with a primer coating of an adhesive material such as a diisocyanate which causes the regenerated cellulose or polymeric alcohol to adhere more tenaciously to the wool fibers. The solutions of decausticized polymeric alcohol xanthates may be applied to wool fibers, yarns, or fabrics by simple immersion of the wool in the solution followed by drying to regenerate the cellulose or other polymeric alcohol on the surface of the fibers, or by a subsequent acid treatment to effect such regeneration of the cellulose or other polymeric alcohol. Treatment of wool with decausticized polymeric alcohol xanthates to produce add-ons of regenerated polymeric alcohols in a range from about 0.1 to 10% or higher addon, based on the weight of the wool, renders the wool substantially completely resistant to milling or felting shrinkage, i.e. irreversible shrinkage which occurs during washing, and drastically reduces the relaxation or process shrinkage, i.e. shrinkage which occurs as a result of contact with water and which may be recovered by stretching the fabric. The exact mechanism by which the treatment with decausticized polymeric alcohol xanthates effects shrink proofing is not entirely understood. However, this treatment is effective to coat the fibers and thus may smooth the surface and reduce the differential friction or may form a wedge between the scales of the individual fibers thus preventing the telescoping of the fibers and eliminating the felting of the fibers. Either or both of these mechanisms may explain the shrink proofing of wool by this technique or the explanation may be found after further investigation.

In the literature there seems to be no universal standard of good shrink proof performance for wool fabrics. Generally, however, a wool fabric which is alleged to be shrink proof should have a felting shrinkage of less than 6% after ten 75 min. washes at 40° C. Ideally, an effective shrink proofing treatment would eliminate both process and felting shrinkage. The attempts to shrink proof wool fabrics by the treatment of this invention had as a goal the reduction of felting or milling shrinkage to a value not exceeding 3% in area of the fabric and the reduction of process or relaxation shrinkage to a value not in excess of 15%. A manufacturer can compensate for process or relaxation shrinkage by weaving a less dense fabric but it is preferred to hold process or relaxation shrinkage of fabrics to a minimum.

In studying the effect of treatment of wool with decausticized polymeric alcohol xanthate solutions the general procedure followed involved the use of separate swatches of wool fabric with ten in. squares marked on the face of the fabric for measurement of shrinkage during processing and subsequent washing. The swatches were treated with the decausticized polymeric alcohol xanthate solutions using various techniques. In most cases the application of solution was by a dip-nip-dry procedure. The fabric was dipped, immersed in the solution for a period of 5 min., nipped, passed through a nip roller to remove excess solution, and dried by heating for 15 min. at 90° C. followed by overnight curing at 40° C. Variations in this procedure involved the pretreatment of the wool with oxidizers or with primer coats of adhesives such as diisocyanates. After drying, the cured swatches were thoroughly ironed to remove incidental wrinkles and to improve hand. The swatches were then process washed 5 min. at 25° C. to remove by-products, tumble dried at 55–60° C., and measured to establish process or relaxation shrinkage.

The finished samples were washed for 75 min. at 40° C. in standard laundry equipment, tumble dried, and measured. The percentage shrinkage was calculated after each wash cycle. When the samples had been washed for a total of 750 min. (ten cycles) the test was discontinued. At this time, the samples were evaluated, considering process shrinkage or relaxation shrinkage, milling or felting shrinkage, and total shrinkage (relaxation plus felting shrinkage).

The following examples illustrate various techniques of treatment of wool in accordance with this invention.

Example 24

A 12 in. square piece of wool was marked with a 10 in. square on its surface with indelible ink in preparation for processing. A solution was prepared of decausticized sodium cellulose xanthate having a 1.3% cellulose concentration and a pH of approximately 10.3 when freshly made. This solution may be made by decausticization of a dilute viscose or by dissolving a decausticized cellulose xanthate powder in accordance with any of the aforementioned examples.

The wool was dipped in the xanthate solution for about 5 min. It was observed that the solution did not penetrate into the wool very rapidly and approximately 5 min. was required for thorough wet-out of the fabric. No wetting agent was used in the solution.

The wool fabric then slowly pulled through an ordinary washing machine wringer set with a spacing to give about 160% liquid pick-up. The wool fabric was then placed for a few minutes in an oven at about 40° C. to begin the thermal regeneration of the cellulose xanthate. After about 30 min., when the wool had partially dried, it was placed in an air circulation oven at 105° C. and removed as soon as it became dry to the touch. The fabric had a 2% cellulose addon based on the weight of the wool.

The fabric was next washed for 12 min. at 60° C., rinsed in warm water and air dried. The fabric was then given a second 12 min. wash at 70° C., rinsed in warm water, spin dried, and then force dried with hot air for 15 min. Afterward, the fabric was given an 8 min. wash in a washing machine at a cotton setting, rinsed in warm water, and dried in an oven at 100° C. and ironed. At the end of the first and second wash steps measurement of the fabric showed no area relaxation shrinkage. At the end of the third wash step there was an area relaxation shrinkage of about 2.59%.

Example 25

In another experiment, the procedure of Example 24 was repeated except that a dilute viscose was substituted for the decausticized sodium cellulose xanthate used in the previous example. In this experiment, the wool wet out more rapidly with the viscose than it did with the decausticized solution in the previous example. The treated wool material was dried briefly in air and then passed into an acid solution to neutralize the free alkali and regenerate cellulose on the fabric. The treated fabric was washed in cold water and air dried.

It was noted that the viscose treated wool was very stiff and that the fibers had already shown fuzziness and felting behavior, probably due to the presence of strong alkali in the viscose. When the fabric pieces were washed in a cotton cycle wash, the shrinkage was about 20% after the first cycle as against 0% shrinkage for the first wash cycle in Example 24.

Another experiment was carried out in which the wool was saturated with viscose and the cellulose regenerated thermally as in Example 24. When the wool containing the viscose was dried at 40° C. for 2 hours and washed it was found to have lost most of its strength. Apparently, the free alkali in the viscose attacks the wool badly during the drying step.

Example 26

A sample of 230 g./yd. double knit red wool was treated in accordance with this invention. The wool was dipped in a solution of pH 10 decausticized sodium cellulose xanthate (2.5% cellulose content), squeezed in a nip roll, and dried as previously described. The fabric had a 2.5% cellulose addon.

After 375 min. washing at 40° C. (5 separate 75 min. washes, with intermediate drying steps) the fabric showed a felting shrinkage of 3.9% based on the measured loss in area of a 10 in. square marked in indelible ink on the surface of the fabric prior to processing. When an untreated control fabric was washed in the same manner for 375 min. there was a 53.1% felting shrinkage (based on the area of the fabric).

Example 27

An undyed virgin wool yarn was hand knit into a fabric and blocked to normal loop size. The prepared swatch was wet out in a pH 10, 2.5% cellulose content solution of decausticized sodium cellulose xanthate as in Example 26.

The fabric was hand squeezed to remove excess solution, reblocked to an 8 x 10 rectangle and cured overnight at ambient temperature. The fabric had a 2.4% cellulose addon.

The hand knit treated fabric was washed as in the above noted examples and after 375 min. washing (5 separate 75 min. washes, with intermediate drying steps) the fabric had increased 7.9% in area. Thus, in the case of the hand knit fabric there was actually a stretching of the fabric on subsequent washing steps and the felting shrinkage was actually negative.

Example 28

A dress goods mixed fabric comprising 85% wool and 15% nylon was stabilized against felting and relaxation shrinkage by the process described in the previous examples. The fabric was dipped in a solution of decausticized sodium cellulose xanthate, squeezed between nip rollers and dried as described above. The fabric had a 2.2% cellulose addon.

The treated fabric was subjected to 750 min. washing (ten 75 min. wash cycles with intermediate drying steps) at 40° C. with rapid agitation. At the end of this time the shrinkage was less than 5% area loss. Control samples subjected to the same wash treatment had shrinkages in excess of 30% based on the area of the samples.

Example 29

A 100% wool, non-mill shrunk, basket weave, 270 g./yd. fabric was treated with a decausticized sodium cellulose xanthate solution (pH 10) as described in the previous example. The treatment was effective to produce a cellulose addon of 2.4% based on the weight of the wool. The wool product was soft and had a good hand.

After 750 min. washing at 40° C. the treated material had a 0% total shrinkage and 0% felting shrinkage. An untreated control had a total shrinkage of 27% after 750 min. washing.

Example 30

A 100% wool crepe fabric was treated with a decausticized sodium cellulose xanthate solution (produced by dissolving a decausticized sodium cellulose xanthate spray dried powder in water at about a 3% cellulose content). The fabric was dipped in solution, squeezed through nip rollers, and dried as in the previous examples. After 750 min. washing at 40° C. with intermediate drying steps the sample shrank 14% in area as compared to 54% shrinkage for an untreated control after a similar amount of washing.

The same procedure for treatment of the wool was repeated with the exception that the wool was given a preliminary soaking for 1 hour at about 40° C. in a 1 molar solution of hydrogen peroxide containing about 0.8% wt. tetrasodium pyrophosphate. The ratio of peroxide solution to cloth was 30:1 by wt. and the solution was maintained at pH 10 by addition of a small amount of ammonia. After steeping in the peroxide solution the fabric was soaked 15 min. in 0.5% acetic acid and dried at 105° C. After receiving this preliminary peroxide treatment the fabric was treated with a decausticized sodium cellulose xanthate solution as described above to produce the same cellulose addon (2.7%) in the wool. After receiving this treatment, the wool was washed for 750 min. as described above and was found to have 13% process shrinkage and 2% stretch (a negative felting shrinkage) during the washing steps. This treatment is effective to completely stabilize the wool against felting shrinkage under the most severe washing conditions.

Example 31

In this example an army wool fabric comprising 85% wool and 15% nylon was treated to reduce shrinkage. The untreated wool exhibited 23.5% total shrinkage and 11.2% felting shrinkage after 750 min. washing in 40° C. water with intermediate drying steps.

The wool-nylon fabric was found to be somewhat acid and so was titrated or buffered to pH 10 prior to treatment. The pH 10 wool was dipped in a solution of decausticized sodium cellulose xanthate to produce a 2.5% cellulose addon in the wool after passing through squeeze rolls and drying. The treated wool was subjected to 750 min. washing in 40° C. water with intermediate drying steps and was found to have a total shrinkage of 7.2% and felting shrinkage of 1.2%. This treatment is effective to stabilize the wool for relatively severe washing conditions. It should be noted that the buffering of the wool to pH 10 was not effective in itself to produce any shrink proofing of the wool.

Example 32

A series of experiments was carried out using a white, mill shrunk, 100% wool, undyed Georgia flannel, weight 207 g./yd. This material, though rather easily stabilized, was subjected to a long series of experiments. The reason for the choice of this material as a standard was that previous work had been done on a bone-dyed Georgia flannel. By using an undyed fabric it was possible to minimize the variables and unknown quantities.

The undyed fabric was dipped in a solution of decausticized sodium cellulose xanthate (to produce a 2.5% cellulose addon for the fabric) passed through squeeze rolls and dried as in previous examples. This treatment was effective to halve total shrinkage and reduced felting shrinkage by a factor of 3, after 750 min. washing. The control exhibited felting shrinkage of 22% after 750 min. washing whereas the treated sample shrank only 7%. Total shrinkage was reduced from 40% for the control to 20% for the treated sample.

Example 33

The procedure of Example 32 was repeated except that a wetting agent, dioctylsulfosuccinate, was added to the sodium cellulose xanthate solution in an attempt to improve the penetration of the solution into the fabric. The addition of the wetting agent did not significantly alter the performance of the sodium cellulose xanthate solution as a shrink proofing treatment.

Example 34

The procedure of Example 32 was repeated with an attempt to cross-link the cellulose to the wool by use of a polymeric aldehyde, dialdehyde starch. The use of the polymeric aldehyde did not significantly improve the performance of the sodium cellulose xanthate solution as a shrink proofing treatment.

Example 35

The procedure of Example 32 was repeated with modification. The cellulose was applied to the wool by use of 2 separate sodium cellulose xanthate baths, one maintained at pH 10 and the other maintained at pH 6. The total cellulose addon from this treatment was 2.2%. This treatment was effective to produce a fabric having a total shrinkage of 12.3% and felting shrinkage of 2.8%.

Example 36

The procedure of Example 32 was repeated except that formaldehyde or a mixture of formaldehyde and ammonium chloride was added to the solution in an attempt to cross-link the cellulose to the wool. This treatment did not improve the results obtained in Example 32 and it was found that excessive amounts of either or both reagents actually increased the tendency of the fabric to shrink.

Example 37

The procedure of Example 32 was modified by providing the wool fabric with a primer coat of a diisocyanate adhesive. Experiments were carried out in which the fabric was treated with (a) 0.05% wt. dianisidine diisocyanate in methylene chloride, (b) 0.05% wt. tolylene diisocyanate in acetone, or (c) 0.05% wt. diphenylene p,p' diisocyanate in acetone. The material was wet out in one of the aforementioned solutions and passed through a laundry wringer adjusted to avoid isocyanate loadings in excess of 0.1%. The solvent was then evaporated at 60° C. and the material treated by the dip-nip-dry procedure. The various isocyanate solutions appeared to be equally effective as surface preparations.

In addition to the above procedures, the following variations of diisocyanate applications were employed:

(a) Control-wool material was treated with the diisocyanate solution and dried and given no further treatment.

(b) The fabric was wet in isocyanate solution and excess solvent evaporated to dryness prior to application of the decausticized sodium cellulose xanthate solution.

(c) The fabric was wet with isocyanate solution and only about half of the solvent evaporated prior to the treatment with decausticized sodium cellulose xanthate solution.

(d) The fabric was wet with isocyanate solution and immediately treated with decausticized sodium cellulose xanthate solution.

(e) The fabric was treated with an isocyanate emulsified in water rather than dissolved in an organic solvent.

(f) The fabric was treated with a decausticized sodium cellulose xanthate solution containing an isocyanate emulsified therein.

It was found that the isocyanates seemed equally effective as an undercoat for the application of sodium cellulose xanthate solutions to wool fabric. Emulsifying isocyanate into the decausticized sodium cellulose xanthate solution, making possible a one bath treatment and lower solvent costs, give the most effective shrink proofing. For this treatment, felting shrinkage ranged from 0.5 to 3.1% after 750 min. washing. When shrink proofing is this nearly complete, minor fluctuations in area wash to wash were noted. Consequently, the range of 0.5 to 3.1% felting shrinkage is approximately within experimental error.

Example 38

The procedure of Example 32 was repeated except that the wool was buffered or titrated to pH 10 prior to application of the sodium cellulose xanthate solution. At a 3% cellulose addon for the fabric the treated product was found to have a felting shrinkage less than 1% after 750 min. of washing. The process shrinking for this fabric was about 18%. The process shrinkage, however, can be easily reduced by processing in a tentor frame or by use of a more loosely woven fabric.

Example 39

In another experiment, the procedure of Example 32 was followed except that the fabric was immersed in pH 1 HCl after it was partially dried to regenerate the cellulose on the wool. This treatment was effective to produce a fabric having a total shrinkage of 24% and a felting shrinkage of 7.9%. However, after the fabric was removed from the acid solution, small particles of cellulose gel were observed floating in the bath. These particles were obviously released from the fabric during the acid treatment. It was, therefore, concluded that no substantial benefit is derived from acid regeneration of cellulose on the wool as compared to thermal regeneration.

Example 40

Wool fabric as used in Examples 32 and following was buffered to pH 10, treated with an isocyanate undercoat, immersed successively in decausticized sodium cellulose xanthate solutions at pH 10 and pH 6 respectively, squeezed, and dried.

The wool treated in this manner was washed for 750 min. at 40° C. with intermediate drying steps and gave a 15% total shrinkage and −1.2% felting shrinkage (1.2% stretch).

Example 41

In another experiment, wool fabric as used in Examples 32 and following was treated by a multi-step procedure. The fabric was first immersed in a dilute solution (0.5% wt.) of decausticized sodium cellulose xanthate and cellulose partially regenerated in the fabric by momentary exposure of the fabric to heat. The fabric was re-immersed in the solution and re-heated for 8 cycles. This treatment was effective to give total shrink proofing against felting shrinkage. This treatment may be described as shrink stabilization by application of multiple thin layers of cellulose on the wool fibers.

Theoretically, the much lower viscosity of the very dilute decausticized sodium cellulose xanthate solution should allow a more rapid and possibly more thorough wetting of the wool fibers. This treatment illustrates any varied reaction of the fibers due to layers of cellulose. This method appears to be potentially more rapid, more easily mechanized and less expensive for stabilization of wool fabrics.

Example 42

In another experiment, the wool fabric used in Examples 32 and following was given an isocyanate undercoat and then treated with a decausticized sodium cellulose xanthate solution under alternate pressure and vacuum for 10 cycles. This method obviously caused more thorough penetration of the sodium cellulose xanthate into the wool fibers and under the scales on fibers. This obviously resulted in a more thorough encapsulation of the fiber. The wool fabric which was treated in this manner was found to have been completely stabilized against felting shrinkage as determined in the 750 min. wash test.

Example 43

A wool sample was prepared following the general technique described in Example 32 but, prior to drying, was folded and creased with a hot iron maintained at a "wool" setting. The treatment with the hot iron was sufficient to regenerate cellulose on the surface of the wool fabric in the area treated by the iron. The regeneration of the cellulose by treatment with the hot iron was effective not only to shrink proof the fabric but also to form a permanent crease in the fabric. The crease which was formed by pressing with the hot iron remains through 750 min. washing or more in 40° C. water. This experiment demonstrates that the treatment with decausticized sodium cellulose xanthate solution is effective not only to shrink proof and felt proof the wool fabric but also to provide a permanent crease in the fabric and to render the fabric resistant to wrinkling and creasing.

While the several examples concerned with the shrink proofing or crease proofing of wool were carried out with solutions of decausticized sodium cellulose xanthate it should be understood that solutions of other decausticized polymeric alcohol xanthates may be used with similar effect, i.e., the solutions of decausticized amylose xanthate, starch xanthate, polyvinyl alcohol xanthate, polyallyl alcohol xanthate, etc. can be substituted in Examples 24 et seq. with similar effect. In general, the selection of the particular polymeric alcohol xanthate which is to be used and the particular conditions of treatment are selected in accordance with the properties desired in the finished product. The solutions of decausticized sodium cellulose xanthate or other polymeric alcohol xanthates may be prepared by decausticization of caustic xanthate solutions or by dissolving the spray dried powders which consist essentially of the decausticized or neutralized polymeric alcohol xanthates in a finely divided form. The degree of substitution of the xanthate in the polymeric alcohol is not critical and generally any D.S. in excess of about 3% is satisfactory. Similarly, the degree of polymerization (D.P.) of the polymeric alcohol xanthate is not critical and may be varied according to the properties desired in a particular product. Generally, polymeric alcohol xanthates of somewhat lower D.P. will be used where less viscous solutions are desired for the purpose of better penetration into the wool fibers.

From the several examples set forth above and from other experimental work done in the shrink proofing of wool fibers we have reached a number of important conclusions. If the wool is in the acid form, adjustment by titration or buffering to a mildly alkaline pH (pH 10) prior to treatment with a decausticized polymeric alcohol solution substantially improves dimensional stabilization of the finished wool product. At very low loading, an isocyanate undercoating aids the polymeric alcohol xanthate treatment in eliminating felting shrinkage but does not appreciably shrink proof wool without the subsequent treatment with a decausticized polymeric alcohol xanthate solution. Final adjustment of the pH of the treated woolen fabric to the isoelectric range in all cases improves substantially the resistance to felting shrinkage. The shrink proofing treatment was not improved by addition of a wetting agent to the decausticized polymeric alcohol xanthate solution.

It was found that the processing of wool in a stretched state during the immersion step minimizes process shrinkage but has no appreciable effect on felting shrinkage. There is no evidence that the improvement with respect to process shrinkage is lost during subsequent washing.

When the wool fabric is etched with hydrgen peroxide prior to treatment with a decausticized cellulose xanthate (or other polymeric alcohol xanthate) solution the felting shrinkage of the finished product is considerably reduced. The felting shrinkage can also be reduced substantially by emulsifying diisocyanates into the cellulose xanthate (or other polymeric alcohol xanthate) solution, making possible a one bath treatment which limits felting shrinkage to very low levels and has the advantage of greatly reduced solvent costs.

While different fabrics require somewhat different treatments, the most effective single treatment found requires (a) buffering the fabric or titrating the fabric to a mildly alkaline ph (about pH 10 (b) coating the fabric with a very low proportion (less than 0.1%) of a diisocyanate (c) soaking the fabric in pH 10, 2.5% solution of decausticized cellulose xanthate (or other decausticized polymeric alcohol xanthate) to produce an addon of about 2–3%, (d) re-immersing the fabric in pH 6 solution of a decausticized polymeric alcohol xanthate, and squeezing out excess liquid, to produce a cellulose addon of approximately 3%, and (e) curing in an oven at about 110–120° C.

The procedures described above are generally effective to reduce both the process shrinkage and felting shrinkage of wool to acceptable levels and in particular reduce the felting shrinkage to a level which permits washing of woolen fabrics under relatively severe washing conditions. The procedure involves the coating of the individual fibers and while it has been carried out primarily on finished woolen fabrics (both dyed and undyed) the treatment is equally effective when carried out on individual fibers or yarns or threads prior to formation of fabrics. The treatment is similarly effective for shrink poofing non-woven woolen fabrics including felts. The regeneration of cellulose or other polymeric alcohol applied to the wool as a decausticized solution may be effected by simple drying of the material at a moderately elevated temperature (or for a longer period of time at room temperature) or by treatment with acid or other chemical reagent to effect chemical decomposition of the xanthate to produce the desired coating of cellulose or other polymeric alcohol. The coating of the wool fibers (or fabric) with cellulose (or other polymeric alcohol) causes a slightly stiffer hand in the fabric. The hand of the fabric becomes progressively softer upon washing.

The coating of the wool fibers produces a surface which is essentially a thin film of regenerated cellulose (or other polymeric alcohol) on each of the fibers in the fabric and thus provides not only shrink proofing and crease proofing in the fabric but also protection against contact with the woolen surface which provides some protection for individuals who have wool allergies or are otherwise sensitive to woolen fabrics.

What is claimed is:
1. A method of treating wool which comprises
   (a) contacting wool fibers, yarns, or fabrics with a solution of a decausticized polymeric alcohol xanthate of D.S. greater than 3% and pH less than 13, and
   (b) regenerating the polymeric alcohol on the wool by heat or by chemical decomposition of the xanthate.
2. A method in accordance with claim 1 in which the solution is prepared by dissolving a dry powder obtained by spray drying a decausticized solution of a polymeric alcohol xanthate.
3. A method in accordance with claim 1 in which the concentration of the solution and time of contact are sufficient to produce a cellulose addon of 0.1 to 10% on the wool.
4. A method in accordance with claim 1 in which the wool is scoured prior to treatment with said solution.
5. A method in accordance with claim 1 in which the wool is partially oxidized prior to treatment with said solution.
6. A method in accordance with claim 1 in which the wool is provided with an adhesive undercoat for the cellulose.
7. A method in accordance with claim 1 in which the wool is provided with a primer coat of an organic polyisocyanate.
8. A method in accordance with claim 1 in which the wool is buffered or titrated to a mildly alkaline pH prior to treatment with said solution.
9. A method in accordance with claim 1 in which the wool is immersed first in one cellulose xanthate solution at about pH 10 and then in another cellulose xanthate solution at about pH 6.
10. The product of claim 1, characterized by improved resistance to felting shrinkage on washing.
11. A product in accordance with claim 10 containing 0.1–10% cellulose.
12. A product as defined in claim 10 in which the wool is partially oxidized prior to treatment.
13. A product as defined in claim 10 in which the wool is provided with a primer coat of an organic polyisocyanate prior to treatment.

References Cited
UNITED STATES PATENTS

| | | | |
|---|---|---|---|
| 3,291,789 | 12/1966 | Bridgeford | 260—217 |
| 3,399,069 | 8/1968 | Bridgeford | 260—217 XR |

MAYER WEINBLATT, Primary Examiner

U.S. Cl. X.R.

8—128; 117—143; 260—214, 217